C. VOLKMANN.
BUTTER MAKING AND MOLDING MACHINE.
APPLICATION FILED MAR. 23, 1912.
1,211,508.
Patented Jan. 9, 1917.
3 SHEETS—SHEET 1.
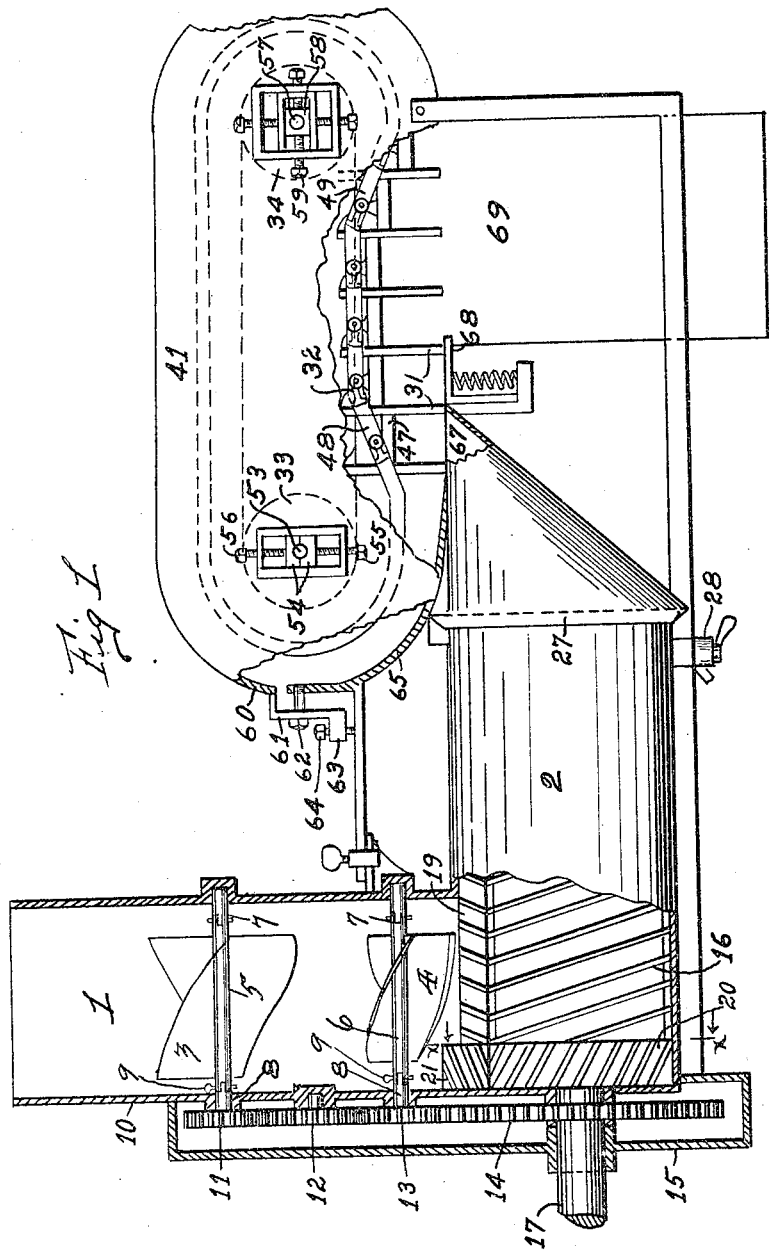
WITNESSES:
INVENTOR
Charles Volkmann
BY
Harry Lea Dodson
ATTORNEY C. VOLKMANN.
BUTTER MAKING AND MOLDING MACHINE.
APPLICATION FILED MAR. 23, 1912.
1,211,508.
Patented Jan. 9, 1917.
3 SHEETS—SHEET 2.
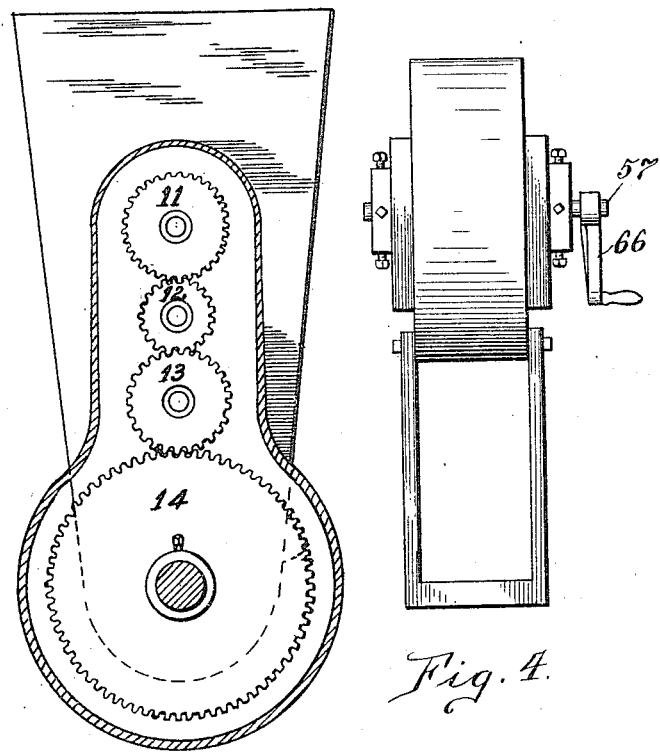
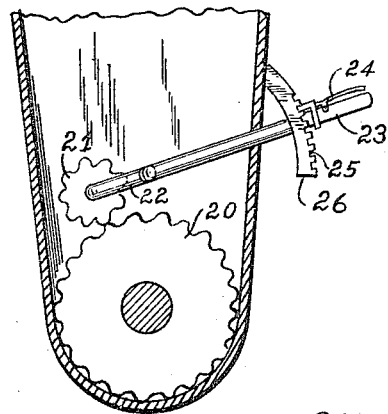
WITNESSES:
INVENTOR
Charles Volkmann
BY
Harry Lea Dodson
ATTORNEY

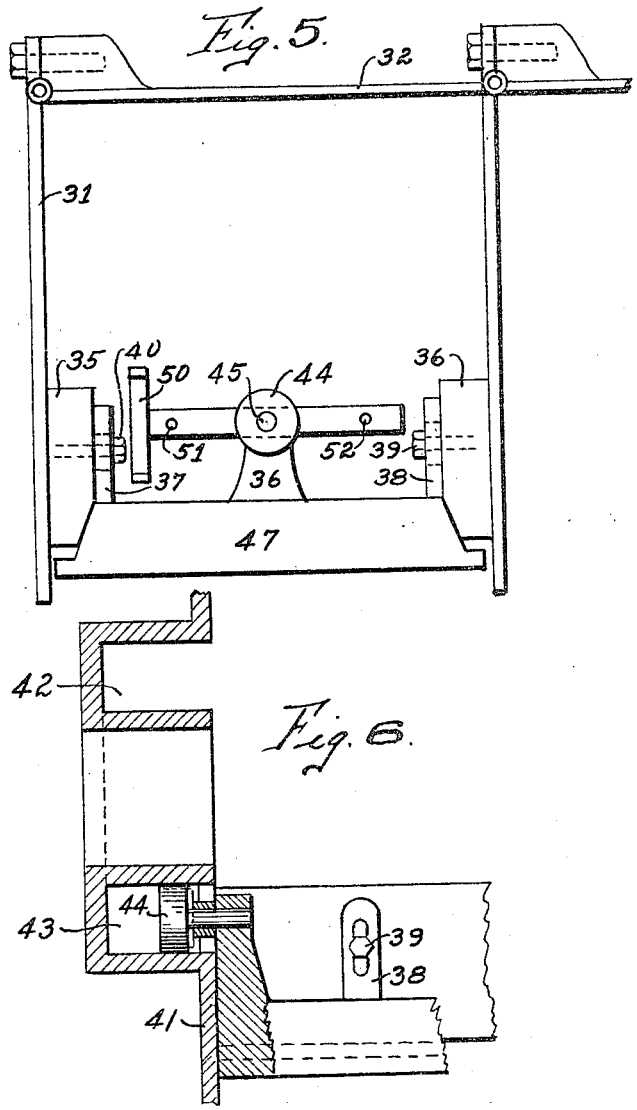

UNITED STATES PATENT OFFICE.

CHARLES VOLKMANN, OF CHICAGO, ILLINOIS, ASSIGNOR TO THE UNIVERSAL BUTTER MACHINE COMPANY, OF CHICAGO, ILLINOIS, A CORPORATION OF ILLINOIS.

BUTTER MAKING AND MOLDING MACHINE.

1,211,508. Specification of Letters Patent. Patented Jan. 9, 1917.

Application filed March 23, 1912. Serial No. 685,823.

*To all whom it may concern:*

Be it known that I, CHARLES VOLKMANN, a citizen of the United States, residing in the city of Chicago, county of Cook, and State of Illinois, have invented certain new and useful Improvements in Butter Making and Molding Machines, of which the following is a specification.

My invention relates to that class of machines which are designed to churn and work the butter and mold it into bricks of a predetermined size and has for its object to provide a machine which will perform the complete operation without the necessity of the operator touching the butter with his hands at any period of its manufacture, and has for its further object to provide an improved device for working the butter and has for its further object to provide a more positive feed than those which are employed in devices of this character and has for its further object to provide a new and improved faucet for draining the buttermilk and salty water off when the butter has been churned and washed.

My means of accomplishing the foregoing may be more readily understood by having reference to the accompanying drawings, which are hereunto annexed and are a part of this specification, in which:

Figure 1 is a side elevation partly in section to show the interior construction. Fig. 2 is an end view with the housing removed. Fig. 3 is a view taken on the line $x$—$x$ in Fig. 1, in the direction indicated by the arrows. Fig. 4 is an end view of the molding device. Figs. 5 and 6 are enlarged detail views, showing the means for guiding the molding device.

Similar reference numerals refer to similar parts throughout the entire description.

As shown in the drawings, my device consists of a vertical rectangular portion 1 and a horizontal cylindrical portion 2. In the vertical portion I mount dashers 3 and 4, which are carried by shafts 5 and 6. These shafts are hinged at 7 and secured to the other end 8 of the shaft by means of a pin 9. This makes their removal comparatively easy and very convenient for the purpose of washing them.

The ends 8 extend through the wall 10 of the vertical portion and have mounted thereon gears 11 and 13. The gear 11 is driven by an intermediate gear 12, which meshes with the gear 13, which is driven by the gear 14 mounted upon a shaft 17. These gears are mounted in a housing 15 and are completely inclosed so as to be inaccessible to dirt or water and are designed to be run in oil, so that they will be thoroughly lubricated under all circumstances and in this manner greatly minimize the wear and noise.

In the cylindrical portion 2 is mounted a conveyer screw 16, which is secured to the shaft 17 which also carries the gear 14 above referred to. This shaft 17 extends outwardly through the housing 15 and may be driven by any suitable power (not shown).

19 is a screw which is fitted to and coincides with the groove in the conveyer 16 for the purpose of making a positive feed, it being driven by the frictional contact with the conveyer 16.

20 and 21 are corrugated rolls, which are designed to assist in the operation of working the butter. The roll 21 is carried by a shaft which extends through the wall of the vertical portion of the machine and has secured to its end a lever 22, which is provided with a handle 23, which has mounted thereon a clutch 24, which is adapted to engage notches 25 cut upon the segment 26, which is secured to the side wall of the machine.

It will be apparent that by moving this lever either up or down the distance between the two rolls 20 and 21 will be correspondingly varied and the butter will be worked to a more or less degree.

While the butter is being churned and worked I fit a cap 27 indicated by the dotted lines in Fig. 1 to the cylindrical portion. The conveyer screw is then rotated in a reverse direction. This causes the cream to be passed upwardly and it is brought in continued contact with the dashers 3 and 4.

When the butter has come, a faucet 28 is opened, the buttermilk drained from the interior and the salty water is put in. The rotation of the conveyer screw is then continued and the butter is thoroughly washed and worked, it being apparent that the conveyer screws 16 and 19 will cause it to be constantly brought in contact with corrugated rolls 20 and 21, which will thus materially assist in working the butter. This operation can be continued until the butter is worked as much as is desired.

When the butter is sufficiently worked, the cap 27 is removed and the device shown in Fig. 1 is attached thereto. This device conveys the butter to the interior of the molding mechanism, which is formed of a series of vertical blades 31, which are carried by links 32 of a chain. This chain is carried upon wheels 33 and 34. Between the vertical blades 31 and slidable vertically therein, is mounted the upper portion of the molding device, which is designed to print any desired configuration on the face of the brick of butter. This is constructed, as better seen in Figs. 5 and 6, with two wedges 35 and 36, which are attached to upwardly extending lugs 37 and 38 by means of bolts 39 and 40.

It will be apparent from an inspection of the drawings, that these wedges can be so arranged as to contact with the sides of the vertical blades 31, this preventing any butter from passing up and beyond the printing portion of the mold.

The side walls 41 of the casing which inclose the molding mechanism are provided with slots 42 and 43, to which are fitted rollers 44, carried by shafts 45 journaled in an upwardly extending portion 36 of the stamping member 47. This slot is provided with inclined portions 48 and 49, the use of which will be hereinafter explained.

If the printing member was swung entirely from the roller 44, it will be apparent from the description that there would be nothing to prevent its turning entirely over when it was passing over the wheels 33 and 34. I prevent this by means of a guide 50, which is secured to the shaft 45 and is adapted to ride in the slot 42. Pins 51 and 52 are mounted in said guide which will contact with the upper surface of the stamp 47, thus preventing its movement beyond a predetermined point.

The wheel 33 is mounted upon the shaft 53, which is journaled in a split block 54, which is provided with screws 55 and 56, by means of which the height of the device may be varied and consequently the size of the mold. At the same time this construction enables one to put pressure upon the shaft 53, thus preventing the free movement of the molds, and in this manner avoiding any possibility of the forming of a brick of under size due to the mold moving before the butter has completely filled the space provided for it.

The shaft 57 of the wheel 34 is mounted in a box 58, which is provided with both vertical and longitudinal adjustment for the purpose of varying the height in the same manner as the shaft 53 has been varied, while the screw 59 is provided to enable the operator to tighten the chain.

The ends 60 of the casing 41, which inclose the molding mechanism, are provided with outwardly extending lugs 61, which have a slot therein through which passes a bolt 62, which is secured to the wall of the casing 41. When the machine has finished its operations, by removing this screw, it becomes possible to lift the upper half of the cover off of the molding mechanism so as to wash the interior without any difficulty. A lug 61 has an outwardly extending portion 63 in which is mounted a bolt 64, which is provided for the elevation of the wall 65 of the casing, so as to keep the distance from its inner edge to the wheel 33, as otherwise, if this adjustment were not provided, the wheel 33 might be lowered and cause the lower edge of the blades 31 to engage the surface of the wall 65 to such an extent as to prevent movement of the chain.

66 is a crank which is secured to the end of the shaft 57 to permit the operator to rotate the wheels and in turn to move the chain when desired.

The operation of the device in making the butter has been already described.

The molding operation is as follows: The cap shown in dotted lines in Fig. 1 being detached and the molding device attached as shown in the said figure upon the conveyer screw 16 being rotated in the right direction, the butter will be fed through the nozzle and will pass up through the opening 67 where it will contact with the stamp 47 and the side walls of the blades 31. Now if the slot was horizontal at this point, it is apparent that the butter would be unable to move the chain at all, but due to the fact that the roller 44 secured to the stamp 47 is located in the inclined portion 48 of the slot, at this period the pressure of the butter will cause it to move upwardly and in order to move upwardly, it must necessarily move outwardly. This operation brings the next adjacent space over the opening 67 and the operation is repeated, these spaces being proportionate to the size of the brick of butter it is desired to form. The blade 31 after it passes the opening 67 is brought into contact with a spring pressed base 68, which operates to smooth the lower surface of the butter so that when it passes off of the said base 68, it is a perfect brick which is ejected upon a suitable inclined plane 69, which carries it to the operator. It will be apparent that as long as there is butter in the cylindrical portion 2 of the machine it will continue this operation of automatically molding the bricks of butter at the same time, inasmuch as the molding mechanism is entirely actuated by the butter itself, that a full and complete brick is insured during each operation, until the supply of butter is eased up, at which time it is possible that there will remain one or two bricks in the molding part of the machine. These can be delivered by the operator rotating the handle 66, which will bring them past the spring-pressed base 68 to a position to which they can be delivered out of the mold.

The action of gravity in ejecting the butter from the walls is not always sufficient as the butter under different temperatures will act differently, and on the surface both of the stamping members 47 and the sides of the vertical blades 31 to overcome this difficulty and in order to prevent the brick being passed on around the machine, I provide the inclined plane 49, which operates to carry the stamping member 47 downwardly and has the effect of positively ejecting the butter from the mold, so that its mechanical delivery is assured under all conditions.

Having described my invention, what I regard as new and desire to secure by Letters Patent is:

1. A butter molding machine comprising a cylindrical member terminating in an upwardly extending conoidal nozzle, means to force the butter through said nozzle, a molding device consisting of a casing, two wheels mounted on axles journaled in the side walls of the casing, a chain carried by the said wheels, a plurality of blades secured to the chain, a stamp intermediate the blades, rollers secured to each stamp, guides formed on the side walls of the casing to which the rollers are fitted whereby the stamps may be vertically reciprocated.

2. A butter molding machine comprising a vertical rectangular portion having a laterally extending cylindrical member at its lower end which terminates in an upwardly extending conoidal nozzle, means to force the butter through said nozzle, a molding device consisting of a casing, two wheels mounted in axles journaled in the side walls of the casing, a chain carried by the wheels, a plurality of blades secured to the chain, a stamp intermediate the blades, rollers secured to each stamp, guides formed on the side walls of the casing to which the rollers are fitted whereby the stamps may be vertically reciprocated.

3. A butter molding machine comprising a vertical rectangular portion having a laterally extending cylindrical member at its lower end which terminates in an upwardly extending conoidal nozzle, a conveyer to force the butter through said nozzle, a molding device consisting of a casing, two wheels mounted on axles journaled in the side walls of the casing, a chain carried by the wheels, a plurality of blades secured to the chain, a stamp intermediate the blades, rollers secured to each stamp, guides formed on the side walls of the casing to which the rollers are fitted, whereby the stamps may be vertically reciprocated.

4. A butter molding machine comprising a vertical rectangular portion having a laterally extending cylindrical member at its lower end which terminates in an upwardly extending conoidal nozzle, a conveyer to force the butter through said nozzle, a molding device consisting of a casing, two wheels, mounted on axles journaled in the side walls of the casing, a chain carried by the wheels, a plurality of blades secured to the chain, a stamp intermediate the blades, rollers secured to each stamp, guides formed on the side walls of the casing to which the rollers are fitted, whereby the stamps may be vertically reciprocated, a screw loosely journaled in the said cylindrical member which meshes with the grooves in the conveyer and means to rotate the conveyer.

5. A butter molding machine comprising a cylindrical member which terminates in an upwardly extending conoidal nozzle, means to force the butter through said nozzle, a molding device consisting of a casing, two wheels mounted on axles journaled in the side walls of the casing, a chain carried by the said wheels, a plurality of blades secured to the chain, a stamp intermediate the blades, rollers secured to each stamp, guides formed on the side walls of the casing to which the rollers are fitted, whereby the stamps may be vertically reciprocated and means whereby said wheels may be manually rotated.

6. A butter molding machine comprising a cylindrical member terminating in an upwardly extending conoidal nozzle, means to force the butter through said nozzle, a molding device consisting of a casing, two wheels mounted on axles journaled in the side walls of the casing, a chain carried by the said wheels, a plurality of blades secured to the chain, a stamp intermediate the blades, rollers secured to each stamp, guides formed on the side walls of the casing to which the rollers are fitted, whereby the stamps may be vertically reciprocated and means carried by the roller shaft to prevent the stamps from turning over.

7. A butter molding machine comprising a cylindrical member terminating in an upwardly extending conoidal nozzle, means to force the butter through said nozzle, a molding device consisting of a casing, two wheels mounted on axles journaled in the side walls of the casing, means to adjust said axles vertically and longitudinally, a chain carried by the said wheels, a plurality of blades secured to the chain, a stamp intermediate the blades, rollers secured to each stamp, guides formed on the side walls of the casing to which the rollers are fitted whereby the stamps may be vertically reciprocated.

In testimony whereof I have signed the foregoing specification.

CHARLES VOLKMANN.

Witnesses:
K. WOLBEY,
C. M. BAUMEISTER.

Copies of this patent may be obtained for five cents each, by addressing the "Commissioner of Patents, Washington, D. C."